Patented Mar. 24, 1953

2,632,764

UNITED STATES PATENT OFFICE 2,632,764

PROCESS FOR THE PREPARATION OF BILE ACIDS FROM BILE

Karl H. Slotta and Johannes Jager, Sao Paulo, Brazil

No Drawing. Application March 25, 1950, Serial No. 152,002

12 Claims. (Cl. 260—397.1)

This invention relates to a new and improved method for the manufacture of oxidized bile acids and it has particular relation to a method in which bile acids are prepared from bile in a new and improved form and are subsequently purified and then subjected to oxidation by new and improved procedures.

One object of our present invention is to provide a method in which the bile acids are recovered from bile in a course, powdery or sandy form which facilitates their recovery and their further processing.

Another object of the present invention is to provide an improved process for purifying the crude bile acids obtained in the before-mentioned coarse, powdery form, by a simple and economical procedure.

It is also an object of our invention to provide a process in which the purified bile acids are subjected to oxidation without the aid of organic solvents and without changing the state of dispersion of the bile acids and oxidation products are obtained with favorable yields and in a satisfactory condition of purity.

Further objects and the advantages of the invention will be apparent from the appended claims and the following specification, which describes by way of example but without limitation, some preferred embodiments of our invention.

In carrying out our present invention, crude bile or bile obtained by dilution of concentrated bile is treated with agitation for about 6 hours with about 2% of its weight of sodium hydroxide in an autoclave at a temperature of 285° to 290° F., the ammonia formed being released from the autoclave from time to time during this treatment. We prefer the use of a concentrated solution of technical grade NaOH in an equal weight of water in an amount of about 20 g. NaOH for every liter of the bile and the application of a gauge pressure of about 40–44 lbs. per square inch during saponification in the autoclave. After this heating period the contents of the autoclave is allowed to cool during one night to about 200° F., and then transferred to an open tank. In the latter the crude bile acids are precipitated substantially at said temperature under vigorous agitation by acidifying the mass with aqueous sulfuric acid containing 20–30% by weight of $H_2SO_4$, to a pH between 3.0 and 3.5. We prefer the use of aqueous sulfuric acid containing about 25% by weight of $H_2SO_4$. By proceeding in this manner, a coarse, powdery or sandy precipitate is formed, which is allowed to settle and the contents of the tank is then cooled to ordinary room temperature of about 60° to 75° F.

The separation of the crude bile acids under the conditions of concentration and temperature described in the preceding paragraph is essential for obtaining a coarse, powdery or sandy precipitate, in contrast to the processes known from the prior art, in which the precipitate is obtained as an oily, resinous or puttylike mass which requires days for becoming brittle enough in order to be pulverized for the necessary subsequent treatments, such as purification, etc. The precipitate obtained according to our invention is heavier than the salt solution resulting from the neutralization and we have found that its powdery or sandy condition very substantially facilitates the subsequent steps of purification and oxidation described hereinafter. Such powdery or sandy precipitate is not formed in any of the processes hitherto known.

After cooling the contents of the tank to room temperature, the supernatant liquid is decanted and rejected. The precipitate is washed with a small quantity of ice-water and freed, as far as possible, from the water by pressing or centrifuging.

In this way, we obtain crude bile acids in an amount of for example 9 to 9.5% of the weight of the crude bile as a coarse powder with a water content of about 25% by weight.

The next following step is the purification of the crude bile acids prepared in the above described manner, in order to almost completely remove from these acids the bile pigments, their decomposition products and the fatty acids in a simple manner and without undue loss of the valuable bile acids.

We have found that this can be accomplished by first preparing from the crude bile acids and strong ethanol an alcoholic suspension containing 60 to 62% by volume of ethanol in the liquid phase besides bile acids in suspension. It is essential that the resulting slurry be very well stirred for at least half an hour. Subsequently, the slurry is cooled to about 15° F. and kept at this temperature over night. The bile acids are then separated from the liquid, for example in a filter press or in a basket centrifuge, and washed sparingly with cold aqueous ethanol containing about 60% by volume of ethanol and then with cold water.

In order to remove the remaining alcohol, the bile acids are dissolved with the necessary quantity of sodium hydroxide. The resulting solution is heated to boiling for a short time, then diluted to a solution of about 10% dry contents and, while hot, precipitated by the addition of aqueous sulfuric acid containing about 20 to 30%, preferably 25% by weight of $H_2SO_4$, to a pH between 3 and 3.5. After cooling, the bile acids are separated from the liquid by filtering or centrifuging. The resulting humid cake may be used directly for the oxidation described hereinafter. It may be also used as a raw material for the manufacture of pure desoxycholic acid, using essentially the method described by M. S. White in Biochem. Journal, 23, 1165–1171 (1929).

The procedure of removing residual alcohol by the treatment described in the preceding paragraph may be modified or even omitted. In the latter case, however, owing to the presence of alcohol, correspondingly more bichromate and sulfuric acid is needed in the subsequent oxidation, and the oxidation requires more time and gives lower yields.

The bile acids obtained in the above described manner are now subjected to oxidation with alkali bichromate and sulfuric acid and we have found that the use of the finely granulated bile acids obtained according to our invention results in particular advantages in the oxidation step.

In the oxidation of unconjugated bile acids to the corresponding keto acids according to the processes known from the art, it is necessary either to use organic solvents or to change the state of dispersion of the bile acids prior to oxidation. It has been known for example to carry out this oxidation in glacial acetic acid solution by means of $CrO_3$ dissolved in acetic acid (Hammarsten, Jahresber. 1881, 767), or to treat cholic acid finely dispersed on infusorial earth with $Na_2Cr_2O_7$ and $H_2SO_4$ (German Patent No. 582,727), or to oxidize cholic acid in a xylene emulsion with $Na_2Cr_2O_7$ and $H_2SO_4$ (German Patent No. 584,704).

In contrast to these procedures, our process uses the finely granulated bile acids obtained in the above described manner, directly without the application of any organic solvent and without changing the state of dispersion of the bile acids. This is accomplished by making use of the weak solubility of the bile acids in warm diluted aqueous sulfuric acid. By stirring well, we make a slurry containing about 20% by weight of bile acids and mix the slurry with concentrated sulfuric acid in an amount of 130 to 140% by weight of the amount theoretically required for the oxidation. At a temperature of about 110° F. we start to add slowly a concentrated aqueous solution of sodium bichromate, always stirring well and cooling so that the temperature is maintained between 115 and 120° F. After the oxidation is substantially completed, the reaction mixture is cooled to ordinary room temperature, for example 60°–75° F., and the small excess of chromic acid present in the mixture is destroyed by the addition of alkali bisulfite. The slurry is then filtered and the filter residue sparingly washed with cold water. The filtered cake is dissolved with sodium hydroxide to a hot solution of about 22 to 25% by weight and a pH between 8.5 and 9. The precipitated chromium hydroxide is filtered while hot, preferably with the use of a filter-aid, and thoroughly washed with hot water. The resulting hot chromium-free solution of 10 to 12% is acidified with aqueous sulfuric acid containing about 20 to 30%, preferably 25%, by weight of $H_2SO_4$, to a pH between 3 and 3.5. After cooling, the oxidized bile acids are filtered and washed with cold water. The humid cake is dissolved in 1.5 times of its volume of hot ethanol, filtered while hot and cooled to about 30° F. The crystals formed on cooling are centrifuged, washed with a small quantity of alcohol of 80% by volume and recrystallized from 6 volumes of alcohol of 80% by volume.

This method avoids the formation of ethylester of the dehydrocholic acid, which could occur if alcohol of higher concentration is used. The crystals are dried at 140° to 160° F. The alcoholic mother liquor is concentrated and gives a second small batch of dehydrocholic acid besides desoxidehydrocholic acid.

The yield of dehydrocholic acid corresponding to the requirements of New and Nonofficial Remedies amounts to at least 1.5% by weight of the raw bile used, without the recovery from the mother liquor, which amounts to an additional 0.3 to 0.4%.

*Example*

250 gallons of fresh ox bile are saponified for 6 hours at 285° to 290° F. with 42 lbs. of sodium hydroxide dissolved in an equal weight of water in an autoclave of about 300 gallons capacity under a pressure of about 40 to 44 lbs. per square inch. The ammonia formed is released from time to time from the autoclave.

After saponification and cooling of the material to about 200° F., the contents of the autoclave is transferred to an open acid-resistant tank of about 300 gallons capacity, and the crude bile acids are precipitated, while hot and with vigorous agitation, by the addition of sulfuric acid to a pH between 3 and 3.5. The necessary quantity of concentrated sulfuric acid is about 80 lbs. Before using it for precipitation, the concentrated sulfuric acid is diluted to about 30 gallons. After cooling of the reaction mixture to a temperature of about 60° F., the supernatant liquid is discarded and the coarse precipitate of about 200 lbs. is removed from the tank.

This procedure is applied to three further batches of fresh ox bile of 250 gallons each, giving about 800 lbs. of humid crude bile acids. The latter are washed twice with about 100 gallons of ice-water and treated in a basket-centrifuge in order to remove as much water as possible. The washed acids are weighed and the water contents determined in a sample, e. g. by xylene distillation. We have found a water content of about 25% by weight.

Taking into account this amount of water, i. e. 195 lbs., a suspension of the crude bile acids in ethanol is prepared by using 35 gallons of 99 vol.-percent ethanol to obtain ethanol of 60 to 62 vol.-percent. In order to effect the desired purification, the resulting slurry is stirred for an hour and cooled to about 15° F. After being kept at this temperature for one night, it is centrifuged in a basket centrifuge and washed with about 30 gallons of ice-cold alcohol of 55–60% by volume and then sparingly with cold water.

The purified bile acids thus obtained are then dissolved with about 40 lbs. of sodium hydroxide and 300 gallons of water to a pH of 9 in a kettle of 500 gallons capacity and boiled for 15 to 20 minutes by the introduction of steam into the liquid. The solution is then diluted to 450 gallons and precipitated at a pH of 3 to 3.5 by the addition of aqueous sulfuric acid of 25% by weight obtained by diluting 54 lbs. of concentrated sulfuric acid with water to 20 gallons. The reaction mixture is cooled to a temperature of 60°–70° F. and the bile acids are now separated from the liquid in a basket centrifuge, giving about 520 lbs. of humid cake with a water content of about 25% by weight, corresponding to 390 lbs. of dry bile acids.

The humid cake is introduced into a wooden tank of 300 gallons capacity and slurried with water to about 200 gallons. Concentrated sulfuric acid is then added to the slurry in the proportion of 1.35 lbs. of $H_2SO_4$ for every pound of the bile acids (dry weight), i. e. a total amount of about 530 lbs.=37 gallons of concentrated sulfuric acid. The slow addition of a concentrated aqueous solution of sodium bichromate is now started at a temperature of 110° F. The sodium bichromate solution is prepared by dissolving 312 lbs. of the crystallized salt in water to 31 gallons, i. e. using for every pound of the dry bile acids 0.8 lb. of crystallized sodium dichromate. Under constant vigorous stirring and cooling by means of cold water circulating in a lead coil, the temperature is maintained at 115° to 120° F. After the addition of all of the dichromate solution, the temperature is maintained under stirring between 110° and 120° F. for at least 2 hours. The slurry is then cooled to about 60° F. and the small excess of chromic acid is destroyed by adding an aqueous solution of sodium bisulfite of 25% by weight. The slurry is passed through a wooden filter-press, sparingly washed with cold water and yields about 100 gallons of wet cake.

In a stainless steel tank, the wet cake is slurried with water to about 200 gallons and heated by the introduction of steam nearly to boiling. A concentrated aqueous solution of about 40 lbs. of NaOH is now added to have a pH between 8.5 and 9 in order to dissolve the cake and precipitate the chromium. Then after the addition of 6 lbs. of infusorial earth as a filter-aid, the precipitated chromium hydroxide is separated by means of an iron filter press and the cake is washed by re-slurrying it twice with hot water. The filtrate must be completely free of chromium. The filtrate is then diluted with water to about 400 gallons in a stainless steel tank and the crude oxidized bile acids are precipitated, while hot, by the addition of diluted aqueous sulfuric acid of 25% by weight, to a pH of 3 to 3.5. The amount of sulfuric acid used in this step corresponds to about 50 lbs. of concentrated sulfuric acid.

The slurry is now cooled to room temperature and passed through a wooden filter press. It yields about 150 gallons of cake which is washed with cold water until practically free from sulfates. We prefer re-slurrying of the cake, as prolonged washing in the filter press results in higher losses.

The washed, humid cake is dissolved in 1½ of its volume, i. e. about 230 gallons of hot ethanol of 99% by volume, using stainless steel apparatus and filtering while hot. The filtrate is cooled for one night to 30° F. and the resulting crystals are separated in a basket centrifuge. The crystals are washed with about 10 gallons of ethanol of 80% by volume, yielding about 270 lbs. humid crystals. These are recrystallized from 195 gallons of hot ethanol of 80% by volume. The crystallized dehydrocholic acid is separated by centrifuging, washing with about 10 gallons of cold ethanol of 60% by volume and dried at 140° to 160° F. After drying, the batch weighs 130–135 lbs., which represents a yield of 1.52 to 1.58% based on the weight of the raw bile used as starting material.

It will be understood by those skilled in the art that our invention is not limited to the specific details, steps and materials described above and may be carried out with various modifications. For example, instead of sodium hydroxide an equivalent amount of potassium hydroxide, and instead of sodium dichromate an equivalent amount of potassium dichromate or chromic acid ($CrO_3$), and instead of sulfuric acid equivalent amounts of other acids, such as hydrochloric acid may be used. But in carrying out our process on a commercial scale, we prefer the cheaper materials, i. e. sodium hydroxide, sodium bichromate and sulfuric acid. These and other modifications can be made without departing from the scope of our invention as defined in the appended claims.

What is claimed is:

1. In a process for preparing bile acids and their oxidation products from bile, in combination the steps of saponifying bile by heating it with a concentrated aqueous solution of an alkali metal hydroxide under pressure at a temperature of about 285°–290° F.; precipitating the bile acids in a coarse powdery condition from the solution formed by the addition of acid to a pH between 3 and 3.5 after cooling said solution to about 200° F., and mechanically separating the precipitate from the liquid; purifying the bile acids resulting from the preceding step by treating said bile acids with aqueous ethanol of 60 to 62% by volume; mixing and heating the bile acids purified with ethanol with an excess of diluted aqueous sulfuric acid and alkali bichromate in a slight excess which is destroyed after oxidation.

2. In a process for preparing bile acids and their oxidation products from bile, in combination the steps of saponifying bile by heating it with a concentrated aqueous solution of an alkali metal hydroxide under pressure at a temperature of about 285°–290° F.; precipitating the bile acids in a coarse powdery condition from the solution formed by the addition of acid to a pH between 3 and 3.5 after allowing said solution to cool to about 200° F., and mechanically separating the precipitate from the liquid; purifying the bile acids resulting from the preceding step by treating said bile acids with aqueous ethanol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of diluted aqueous sulfuric acid and alkali bichromate in a slight excess which is destroyed after oxidation.

3. In a process for preparing bile acids and their oxidation products from bile, in combination the steps of saponifying bile by heating it with sodium hydroxide dissolved in about an equal amount of water, under pressure at a temperature of about 285° to 290° F.; precipitating the bile acids in a coarse powdery condition from the solution formed by the addition of aqueous sulfuric acid containing 20 to 30% by weight of $H_2SO_4$, to a pH between 3 and 3.5 after allowing said solution to cool to about 200° F., and mechanically separating the precipitate from the liquid; purifying the bile acids resulting from the preceding step by treating said bile acids with aqueous alcohol of 60 to 62% by volume; mixing and heating the bile acids purified with ethanol with an excess of aqueous sulfuric acid and a concentrated solution of sodium bichromate in a slight excess which is destroyed after oxidation.

4. In a process for preparing bile acids and their oxidation products from bile, in combination the steps of saponifying bile by heating it with sodium hydroxide dissolved in about an equal amount of water, under pressure at a temperature of about 285° to 290° F.; precipitating the bile acids in a coarse powdery condition from the solution formed by the addition of aqueous sulfuric acid containing 20 to 30% by weight of $H_2SO_4$, to a pH between 3 and 3.5 after allowing said solution to cool to about 200° F., and mechanically separating the precipitate from the liquid; purifying the bile acids resulting from the preceding step by treating said bile acids with aqueous alcohol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of aqueous sulfuric acid and a concentrated solution of sodium bichromate in a slight excess which is destroyed after oxidation.

5. In a process for preparing bile acids and their oxidation products from bile, in combination the steps of saponifying bile by heating it with about 2% of its weight of sodium hydroxide dissolved in an about equal amount of water under a gauge pressure of about 40–44 lbs. per square inch at a temperature of about 285° to 290° F.; precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F., and mechanically separating the precipitate from the liquid; purifying the bile acids resulting from the preceding step with aqueous alcohol of 60 to 62% by volume; mixing and heating the bile acids purified with ethanol with an excess of aqueous sulfuric acid and a concentrated solution of sodium bichromate in a slight excess which is destroyed after oxidation.

6. In a process for preparing bile acids and their oxidation products from bile, in combination the steps of saponifying bile by heating it with about 2% of its weight of sodium hydroxide dissolved in an about equal amount of water under a gauge pressure of about 40–44 lbs. per square inch at a temperature of about 285° to 290° F.; precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F., and mechanically separating the precipitate from the liquid; purifying the bile acids resulting from the preceding step with aqueous alcohol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of aqueous sulfuric acid and a concentrated solution of sodium bichromate in a slight excess which is destroyed after oxidation.

7. In a process for preparing bile acids and their oxidation products from bile, in combination the steps of saponifying bile by heating it with about 2% of its weight of sodium hydroxide dissolved in an about equal amount of water under a gauge pressure of about 40–44 lbs. per square inch at a temperature of about 285° to 290° F.; precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F., and mechanically separating the precipitate from the liquid; purifying the bile acids resulting from the preceding step with aqueous alcohol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of aqueous sulfuric acid and a concentrated solution of sodium bichromate in a slight excess which is destroyed after oxidation; filtering the reaction mixture, dissolving the filter residue in aqueous alkali and separating precipitated chromium hydroxide from the solution formed; acidifying the solution by the addition of aqueous sulfuric acid of 25% by weight to a pH between 3 and 3.5; separating the precipitated acids from the liquid and purifying said acids with aqueous ethanol of 80% by volume.

8. In a process for preparing bile acids and their oxidation products from bile, in combination the steps of saponifying bile by heating it with about 2% of its weight of sodium hydroxide dissolved in an about equal amount of water under a gauge pressure of about 40–44 lbs. per square inch at a temperature of about 285° to 290° F.; precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F., and mechanically separating the precipitate from the liquid; purifying the bile acids resulting from the preceding step with aqueous alcohol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of aqueous sulfuric acid and a concentrated solution of sodium bichromate in a slight excess which is destroyed after oxidation; filtering the reaction mixture, dissolving the filter residue in aqueous alkali and separating precipitated chromium hydroxide from the solution formed and washing said precipitate; acidifying the solution by the addition of aqueous sulfuric acid of 25% by weight to a pH between 3 and 3.5; separating the precipitated acids from the liquid and purifying said acids with aqueous ethanol of 80% by volume.

9. In a process for preparing bile acids and their oxidation products from bile, in combination the steps of saponifying bile by heating it with about 2% of its weight of sodium hydroxide dissolved in an about equal amount of water under a gauge pressure of about 40–44 lbs. per square inch at a temperature of about 285° to 290° F.; precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F., and mechanically separating the precipitate from the liquid; purifying the bile acids resulting from the preceding step with aqueous alcohol of 60 to 62% by volume; removing residual alcohol from the bile acids by dissolving them in aqueous alkali, heating the solution and re-precipitating the bile acids from the solution by the addition of acid to a pH of 3 to 3.5; mixing and heating the bile acids purified with ethanol with an excess of aqueous sulfuric acid and a concentrated solution of sodium bichromate in a slight excess which is destroyed after oxidation; filtering the reaction mixture, dissolving the filter residue in aqueous alkali and separating precipitated chromium hydroxide from the solution formed in the presence of a filter-aid and washing said precipitate; acidifying the solution by the addition of aqueous sulfuric acid of 25% by weight to a pH between 3 and 3.5; separating the precipitated acids from the liquid and purifying said acids with aqueous ethanol of 80% by volume.

10. In a process for preparing bile acids from bile, the steps of saponifying bile by heating it with about 2% of its weight of sodium hydroxide dissolved in an about equal amount of water under a gauge pressure of about 40–44 lbs. per square inch at a temperature of about 285° to 290° F. and precipitating the bile acids in a coarse powdery condition from the solution formed by the addition of aqueous sulfuric acid containing about 25% by weight of $H_2SO_4$, to a pH between 3 and 3.5 after cooling said solution to about 200° F.

11. In a process for preparing bile acids from bile by saponification of the bile and precipitation of the bile acids by the addition of acid to the solution of saponification products, the step of purifying the precipitated bile acids by forming a suspension of substantially undissolved bile acids in ethanol, said suspension containing 60 to 62% by volume of ethanol, stirring the suspension for at least ½ hour, and mechanically separating the liquid from the bile acids.

12. A process for preparing bile acids and their oxidation products from bile, said process comprising the steps of saponifying bile by heating it with about 2% of its weight of sodium hydroxide dissolved in an about equal amount of water under a gauge pressure of about 40–44 lbs. per square inch at a temperature of about 285° to 290° F. and precipitating the bile acids in a coarse powdery condition from the solution formed by the addition of aqueous sulfuric acid containing about 25% by weight of $H_2SO_4$, to a pH between 3 and 3.5 after allowing said solution to cool to about 200° F.; purifying the precipitated bile acids by forming therefrom a suspension in ethanol, said suspension containing 60 to 62% by volume of ethanol, stirring the suspension for at least ½ hour, cooling it to about 15° F. and mechanically separating the liquid from the bile acids; mixing and heating the bile acids purified with ethanol with an excess of aqueous sulfuric acid and a concentrated solution of sodium bichromate in a slight excess which is destroyed after oxidation.

KARL H. SLOTTA.
JOHANNES JAGER.

REFERENCES CITED

The following references are of record in the file of this patent:

UNITED STATES PATENTS

| Number | Name | Date |
|---|---|---|
| 1,933,003 | Boedecker | Oct. 31, 1933 |
| 2,346,239 | Sifferd | Apr. 11, 1944 |
| 2,411,169 | Sifferd | Nov. 19, 1946 |

OTHER REFERENCES

Gauthier et al., Chem. Abst. 42, cols. 7308–7309 (1948).